Figure 1:
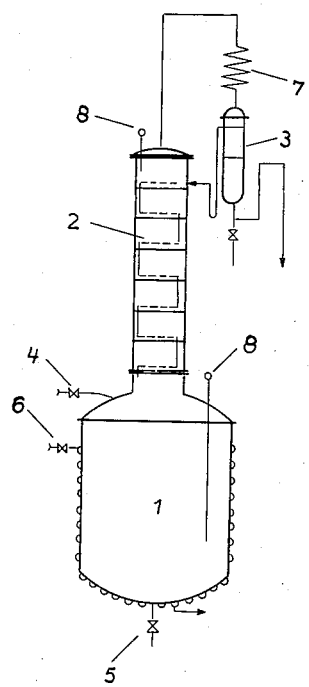

Jan. 24, 1961 W. METZGER ET AL 2,969,406
PROCESS FOR PREPARING 1,3,5-TRIPHENYL-BENZENE
Filed Dec. 9, 1958 2 Sheets-Sheet 1

INVENTORS
WALTER METZGER
HEINZ SCHÜNEMANN
BY
DEZSOE STEINHERZ
ATTORNEY

Jan. 24, 1961  W. METZGER ET AL  2,969,406
PROCESS FOR PREPARING 1,3,5-TRIPHENYL-BENZENE
Filed Dec. 9, 1958  2 Sheets-Sheet 2

INVENTORS
WALTER METZGER
HEINZ SCHÜNEMANN
BY
DEZSOE STEINHERZ
ATTORNEY

United States Patent Office 2,969,406
Patented Jan. 24, 1961

2,969,406
PROCESS FOR PREPARING 1,3,5-TRIPHENYL-BENZENE

Walter Metzger and Heinz Schünemann, Letmathe, Westphalia, Germany, assignors to Rutgerswerke-Aktiengesellschaft, Frankfurt am Main, Germany Filed Dec. 9, 1958, Ser. No. 779,158

Claims priority, application Germany Dec. 14, 1957

11 Claims. (Cl. 260—670)

This invention relates to a process for preparing 1,3,5-triphenyl-benzene and it has particular relation to the preparation of 1,3,5-triphenyl-benzene by condensation of acetophenone.

The preparation of 1,3,5-triphenyl-benzene from acetophenone has been known in the art for a long time. According to Engler (Berichte der deutschen Chemischen Gesellschaft, 26 (1883) 1447), upon heating acetophenone for an extended period of time at ordinary atmospheric or increased pressure, up to 45% of 1,3,5-triphenyl-benzene are obtained in addition to dypnone and resinous by-products, with considerable decomposition of the acetophenone. Furthermore, 1,3,5-triphenyl-benzene is obtained by conversion during several days of acetophenone in the presence of hydrochloric acid or $KHSO_4$ and a small amount of sulfuric acid (see Engler, Berichte der deutschen Chemischen Gesellschaft 7 (1874) 1123 and Odel and Hines, Journal American Chemical Society, 35 (1913) 82). It has also been suggested by other investigators to carry out conversion of acetophenone into 1,3,5-triphenyl-benzene in the presence of aniline and aniline hydrochloride, or aniline and iodine. Thereby, the aniline must be recovered by troublesome procedures and the triphenyl-benzene is obtained in a poorly crystallizing form with a content of resinous impurities.

It has now been found that 1,3,5-triphenyl-benzene can be obtained by condensation from acetophenone in easily separable form, essentially without the formation of undesired reaction products and within short reaction periods, if condensation is carried out in the presence of a catalyst consisting of boron trifluoride or its addition products of acid character, such as the hydrates and particularly boron trifluoride diacetic acid. Thereby, yields of 70% based on the acetophenone charge and yields up to 95% and more, based on the reacted acetophenone and the dypnone which can be re-used, are obtained.

The use of boron trifluoride in reactions which take place with splitting off of water, for example in nitrations and sulfonations, has been known from the art. However, in these known processes the boron fluoride must be used in stoichiometric amounts in order to bind the water formed as the hydrate of boron trifluoride. The aldol condensation of suitable aldehydes and ketones by saturation of their solutions with boron trifluoride has been likewise known.

In contrast to the above known processes it has now been unexpectedly found that the formation of 1,3,5-triphenyl-benzene from acetophenone according to the equation $$3C_6H_5COCH_3 = 3H_2O + C_{24}H_{18}$$

takes place quickly already in the presence of rather small amounts of the $BF_3$ catalyst, i.e. 0.2–1.0% and can be carried out by heating to boiling the acetophenone in the presence of the catalyst. The 1,3,5-triphenyl-benzene thus obtained is distinguished by its bright color and easy crystallization.

The reaction can be considerably accelerated by constant removal of the split off water by means of a carrier medium, which may be a gas which is indifferent to the acetophenone-boron trifluoride mixture, e.g. carbon dioxide or nitrogen, or a liquid which forms an azeotropic mixture with water. Acetophenone proper can also be used as such carrier medium. The reaction according to the present invention starts at about 160° C., but temperatures in the range of 200°–250° C. are necessary for obtaining sufficiently quick reaction. It is, therefore, necessary to maintain an adequate temperature in the reaction space, by the selection of a suitable carrier medium or substance, or by maintaining an adequate temperature in a suitable distilling apparatus in the reaction space.

The reaction according to the present invention takes place with the formation of dypnone as an intermediate product which further reacts with acetophenone with the formation of 1,3,5-triphenyl-benzene. Therefore, in carrying out the process of the invention it is essential to always maintain in the reaction mixture an acetophenone concentration which is sufficient for the reaction of dypnone with acetophenone, because otherwise side reactions of the dypnone occur, with the formation of dark-colored products which have an inhibiting effect on the crystallization of 1,3,5-triphenyl-benzene. It has been found necessary to conduct the reaction in such manner that the splitting off of water be less than 1 mol $H_2O$ per mol of acetophenone, and preferably does not exceed 0.8 mol $H_2O$ per mol of acetophenone.

In discontinuous operation the above conditions can be met (a) by interrupting the reaction before the limit of 0.8 mol $H_2O$ per mol acetophenone is reached, or (b) by adding to the reaction mass fresh acetophenone after a certain reaction period. This fresh acetophenone introduced into the reaction mixture may, or may not, contain the catalyst.

If the present invention is carried out as a continuous process, the period of stay of the reaction mixture in the reaction space is selected, in dependence on the catalyst concentration in the reaction mixture and on the reaction temperature, in such manner that the above conditions are met. The introduction of acetophenone into the continuous process can be carried out in direct current, or in counter-current relative to the removal of reaction water from the reaction. Furthermore, a reaction space having a temperature drop or gradient, for example a distillation column, can be used, whereby the acetophenone can be introduced into the distillation system at one or several points, in order to safely obtain the necessary concentration of acetophenone in the reaction system.

Furthermore, the reaction can be carried out in two stages, whereby in the first stage mainly dypnone is formed, while in the second stage additional acetophenone is introduced into the reaction system. The concentration of the catalyst can be different in the two stages.

The 1,3,5-triphenyl-benzene produced in the above described manner is of very bright yellow color and can be easily separated from its accompanying ingredients by centrifuging, particularly in the presence of acetophenone. It has a melting point of 168°–171° C., which is adequate for many reactions. Particularly good results were obtained by crystallizing the 1,3,5-triphenyl-benzene from acetophenone and washing the crystals with methanol.

The mother liquors obtained in carrying out this invention can be reintroduced into the process of the invention either directly, or after their distillation under vacuum, whereby additional amounts of 1,3,5-triphenyl-benzene can be recovered.

The following examples describe some specific embodiments of and best modes for carrying out the invention, to which the invention is not limited.

Example 1

300 parts of acetophenone are heated in a reaction vessel provided with a short distilling column and a water separator, with the addition of benzene in such an amount that a sump temperature of 198° C. is obtained. To this mixture 5 parts of a catalyst solution which consists of 1.3 parts of BF$_3$ in 60 parts of acetophenone are added. After 10 minutes, an additional amount of 10 parts of the catalyst solution is added to the reaction mixture and the velocity of splitting off and separation of water is kept constant by suitable addition of catalyst solution to the reaction mixture. Within 100 minutes, 35 parts of the catalyst solution are thus used up, and the amount of the separated reaction water is equal to about 75% of the theory. At this point the reaction is interrupted by discontinuing heating and allowing cooling of the reaction mass in order to cause solidification of the same. This reaction mass is now melted with the addition of ⅙ of its weight of acetophenone, is subjected to cooling and subsequent centrifuging, whereby a yield of about 70% of 1,3,5-triphenyl-benzene calculated on the amount of the acetophenone charged is obtained.

Example 2

Acetophenone, to which 0.7% of boron fluoride diacetic acid have been added, is heated to boiling in a reaction vessel of the type described in the above Example 1. The temperature in the sump rises within about 100 minutes to about 265° C., when the amount of separated water reaches 75% of the theory. The heating is now interrupted and after cooling the reaction mass is sucked off or centrifuged. 56% of the theoretically calculated amount of 1,3,5-triphenyl-benzene are thus obtained and an additional amount of 10% can be recovered from the mother liquors. A total of 66% is thus obtained and this corresponds to a yield of 97%, with consideration of the amount of unreacted acetophenone and of the amount of dypnone formed.

Example 3

105 parts of acetophenone, to which 1% of boron trifluoride diacetic acid has been added, is introduced into and heated in a reaction vessel of the type described in the above Example 1, while 195 parts of the same acetophenone-catalyst-mixture are introduced into the reaction vessel in 6 equal portions within 3 hours. Thereby the sump temperature rises to 245° C. After cooling, the reaction mass is mixed with 25% of benzene and the 1,3,5-triphenyl-benzene is recovered in the manner described in the above Example 1. About 60% of the theoretically calculated amount of 1,3,5-triphenyl-benzene are thus obtained.

Example 4

300 parts of pure acetophenone are introduced into and heated in the apparatus described in the above Example 1, and benzene is added as a carrier medium in such amount that the initial temperature in the sump amounts to about 200° C. A mixture of 60 parts of acetophenone and 3.6 parts of boron fluoride diacetic acid are then introduced into the benzene-acetophenone mixture, within 3 hours. After 3½ hours, the reaction is completed. The final temperature in the sump amounts to about 265° C. After cooling, 50 parts of acetophenone are added to the reaction mass, and the 1,3,5-triphenyl-benzene is recovered in the manner described in the above Example 1. 230 parts of 1,3,5-triphenyl-benzene are obtained by centrifuging, which corresponds to 75% of the theory.

Example 5

To start the process, acetophenone containing 1% of boron fluoride diacetic acid is introduced into the sump of a distillation column having 5-10 theoretical plates, in mixture with benzene added in an amount which can be taken up during the condensation reaction by the upper part of the column and the device for separation of water in the distillation system. Under heating the reaction mass and distilling off and separating the water formed, the temperature is allowed to rise in the sump to about 235°-240° C. Acetophenone containing 1% boron trifluoride diacetic acid is then fed continuously to the sump with such velocity that the period during which the material thus introduced into the sump stays in the distillation system for about 1 hour. The amount of heat supplied to the distillation system should be regulated in such manner that no decrease of the above mentioned sump temperature occurs. The reaction water is distilled off at the head of the column, while the initial volume of the reaction mixture in the sump is kept constant by suitable discharge regulating means, e.g. a siphon system.

The reaction product continuously discharged from the sump contains about 45% of 1,3,5-triphenyl-benzene, 30% of dypnone and 25% of acetophenone. Upon cooling this reaction product, about 50% of the 1,3,5-triphenyl-benzene separate in solid form and are recovered by centrifuging. From the mother liquor, the acetophenone and dypnone are separated by distillation, preferably in vacuo, while the 1,3,5-triphenyl-benzene is obtained as a mass of well-formed crystals as the distillation residue. The amount of the 1,3,5-triphenyl-benzene directly crystallizing from the discharged reaction mass is equal to about 25-28%, based on the theoretical amount obtainable from the acetophenone introduced into the process, while the total amount of 1,3,5-triphenyl-benzene recovered, is equal to 50% of the theory based on the amount of acetophenone introduced into the process, and to 64% of the theory based on the amount of the reacted acetophenone.

Example 6

The process is carried out in the manner described in the above Example 5, whereby, however, the mixture of acetophenone and catalyst is introduced into the distillation column at the head end of the column, below the inlet opening for the benzene reflux. By regulating the feed and discharge of the starting material and reaction product, respectively, in such manner that the material treated in the reaction system stays therein for about 1 hour, a reaction product containing about 20% of 1,3,5-triphenyl-benzene, about 48% of dypnone, and about 31% of acetophenone, is formed. About 50% of the triphenyl-benzene formed can be obtained from the discharged reaction product by cooling and subsequent centrifuging and the triphenyl-benzene thus obtained is of very bright color. From the mixture of triphenyl-benzene, dypnone, and acetophenone, separated in the centrifuge, the triphenyl-benzyl is recovered by distilling off the dypnone and acetophenone. The total amount of 1,3,5-triphenyl benzene obtained in this example amounts to about 20% of the theoretical amount, based on the amount of acetophenone introduced into the process, and about 31% of the theoretical amount based on the amount of reacted acetophenone.

Example 7

102 parts of dypnone obtained e.g. by distillation from the oil separated from the reaction product by centrifuging, in the manner described in the above Example 5 or 6, are mixed with 60 parts of acetophenone—i.e. in a molecular proportion of 1:1—and to this mixture 0.7% of boronfluoride diacetic acid is added. The reaction is carried out in the distillation system described above in Example 1, with the addition of benzene as the carrier substance. The reaction conditions, particularly the amount of heat supplied to the distillation system, are selected in such manner that the reaction period in the distillation system amounts to about 1 hour and the final temperature in the sump of the column is about 260° C. Under these conditions, the material discharged from the sump contains about 18 parts of acetophenone, 68 parts of dypnone and 57 parts of 1,3,5-triphenyl-benzene. If dypnone is used in the presence of a considerable excess of acetophenone—e.g. in a molecular ratio of 1:4—the yield of 1,3,5-triphenyl-benzene will be reduced.

The percent and amounts stated herein are by weight if not otherwise stated, throughout the application.

*Example 8*

360 parts of acetophenone, to which 1.8 parts of boronfluoride formic acid have been added, are heated to boiling in a reaction vessel of the type described in the Example 1. The reaction is interrupted when the amount of water split-off reaches about 65% of the theory. By further proceeding in the manner according to the preceding examples, about 90 parts of yellow 1,3,5-triphenylbenzene are thus obtained. By vacuum distillation of the mother liquors, about 20 parts of acetophenone, 145 parts of dypnone and an additional amount of about 50 parts of 1,3,5-triphenyl-benzene are recovered.

*Example 9*

1800 parts of acetophenone, to which 25 parts of boron-fluoride phosphoric acid have been added, are heated to boiling in a reaction vessel of the type described in the above Example 1. After about 150 minutes, the amount of water split-off reaches about 70% of theory and the reaction is interrupted. By treating the reaction mass in the manner described in the preceding examples, 530 parts of 1,3,5-triphenyl-benzene are directly obtained. From the mother liquors an additional amount of 1,3,5-triphenyl-benzene can be recovered.

It will be understood from the above that this invention is not limited to the specific conditions and details described above and can be carried out with various modifications without departing from the scope of the invention as defined in the appended claims.

Thus, in the above Example 1, to the 300 parts of acetophenone 20 to 40 parts of benzene are added in order to obtain a boiling temperature of about 198° C. in the sump. The temperature in the sump is adjusted by distilling off the excess benzene till 198° C. are reached and the velocity of the reaction and of the separation of water is kept constant by increasing or decreasing the rate of adding catalyst to the reaction mixture. The vessel may be heated by means of high pressure steam jacket or heating coil, circulation heating, or any heating device known in the art. In order to obtain a boiling temperature of about 200° C. in the sump according to the above Example 4, to the 300 parts of acetophenone 20 to 40 parts of benzene are added and the temperature adjusted in the same manner as in Example 1. In the continuous procedure described in the above Example 5, for 100 parts of the acetophenone-catalyst mixture 5 to 20 parts of benzene are used. The quantity of benzene is adapted to the still used according to the directions of Example 1. The level of the separator must be kept constant by taking off the water continuously to avoid fluctuations in the column by irregular reflux of benzene, which may cause fluctuations of temperature in the sump. The reaction product discharged from the sump in the above Example 5 is cooled to about 20° C. in order to obtain solidification of the 1,3,5-triphenyl-benzene present in said product. Separation of the acetophenone and dypnone in the above Example 5 is carried out by distillation under a pressure of 1 to 10 mm. of mercury. In carrying out the process according to the above Example 7 the mixture of 102 parts of dypnone and 60 parts of acetophenone is treated with the addition of 20 to 40 parts of benzene, and this process is carried out in the apparatus described and in conformity with the directions of Example 1. Furthermore, instead of the condensation catalysts described above, other boronfluoride addition compounds of acid character, for example with formic acid, acetic acid, phosphoric acid, can be used in equivalent amounts, and in the manner described in the above examples. A mixture of several catalysts can be also used. The catalysts are used in an amount of 0.1 to 5% based on the weight of the acetophenone to be condensed and the range of 0.2–1.5% is preferred. As further examples of carrier substances toluene, xylene, white spirit, $CO_2$, $N_2$, acetophenone are mentioned. It will be also understood from the above that the condensation according to the present invention is carried out under ordinary atmospheric pressure.

The appended drawings illustrate diagrammatically and by way of example apparatus for carrying out the process of the invention.

Figure 2:
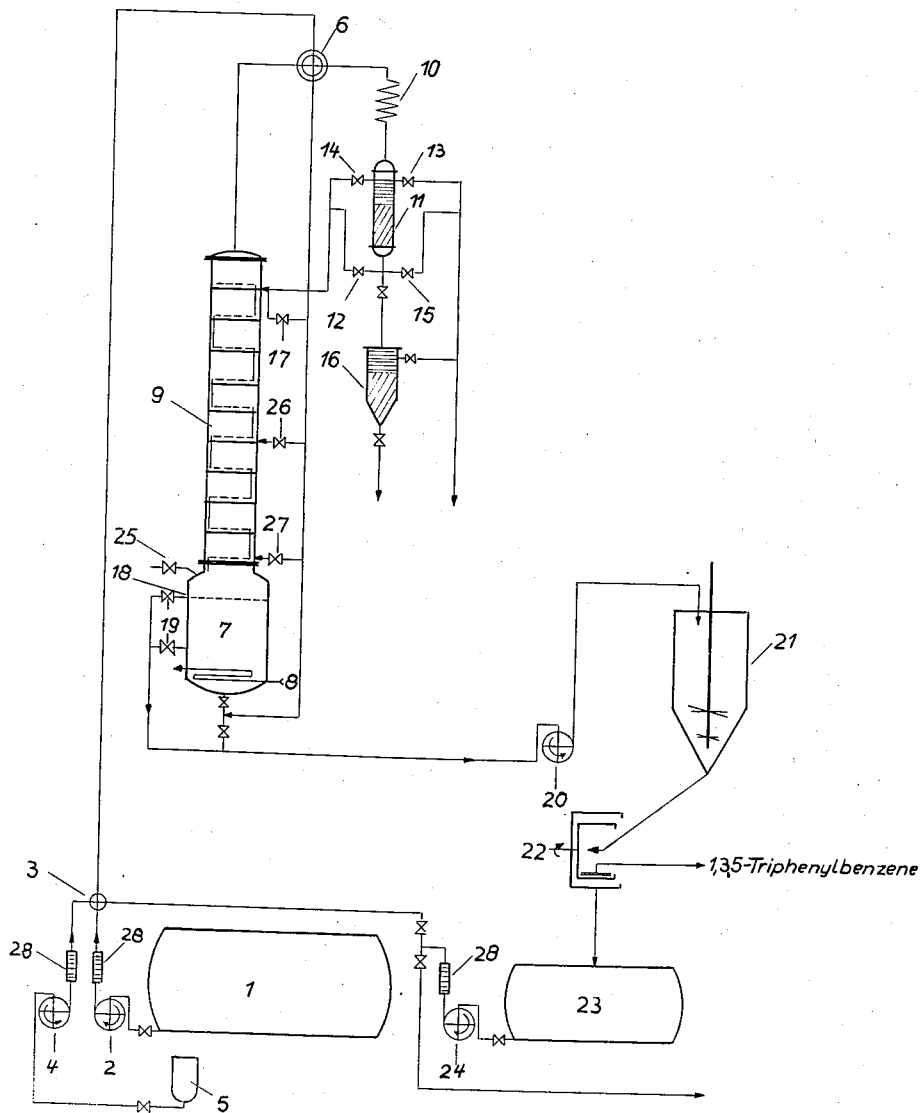

Fig. 1 is an apparatus adapted to be used for the discontinuous operation, while Fig. 2 shows an apparatus suitable for the continuous process.

In Fig. 1, the reaction vessel is denoted by reference symbol 1. The short column connected with said vessel and having 7 conventional bubble trays, is shown at 2 and the water separator at 3. The starting materials are introduced into vessel 1 at 4 and the end product is discharged at 5. Means for heating the reaction vessel are shown at 6. The apparatus is provided with a cooler 7 and thermometer 8.

In the apparatus shown in Fig. 2, reference symbol 1 denotes a storage vessel for acetophenone. A centrifugal pump 2 transports the acetophenone to the mixing chamber 3 where the catalyst from the vessel 5 is added by the centrifugal pump 4. Passing the heat exchanger 6, the acetophenone-catalyst mixture is fed into the sump of the reaction chamber 7, this chamber being heated by the high-pressure steam coil 8. As the reaction proceeds, the vapors pass the column 9 which is provided with 10 bubble cap trays of conventional design. At the head of the column a mixture of water and acetophenone is distilled off and precooled in the heat exchanger 6 and finally condensed in the cooler 10. From the separator 11 the acetophenone is reintroduced into the column as reflux through valve 12 and the reaction water taken off at 13 (the valves 14 and 15 being closed).

Or the distillate is collected in a container 16, from which water and acetophenone can be drawn off, the latter being recycled to the storage vessel 1 or 23. The reflux in this case is maintained by a side stream of the feeding line through valve 17.

The sump product is discharged at 18—the two valves 19 symbolizing a leveling installation—and runs by means of the centrifugal pump 20 to the sedimenting container 21 to cool and to partially solidify. Subsequently treated in the centrifuge 22 the 1,3,5-triphenyl-benzene is separated from the mother liquor to be stored in tank 23. The mother liquor can be recycled to the process by the centrifugal pump 24 or transferred to a distillation plant to separate acetophenone, dypnone and triphenylbenzene. If a carrier substance, such as benzene is used, the process needs the addition of the carrier substance through valve 25 to the reaction chamber 7 in an amount explicated in the above Example 1. Corresponding to the densities of the liquids to be separated, the valves 14 and 15 of the separator are opened.

The valves 17, 26, 27 indicate other possibilities of feeding the system.

The $BF_3$ catalyst can be used in the form of a gas or solution and the boron fluoride diacetic acid can be used in the form of a solution and directly introduced into the reaction. A good solvent for these catalysts is, for example, the acetophenone itself. For easier dosing and measuring a flow-meter 28 can be used.

What is claimed is:

1. A process for the preparation of 1,3,5-triphenyl-benzene by condensation of acetophenone with splitting off of water, comprising heating acetophenone in the range of 160°–250° C. in the presence of a catalytic amount of a condensation catalyst selected from the group consisting of boron fluoride, hydrates of boron fluoride, boron fluoride diacetic acid, boron fluoride formic acid, boron fluoride acetic acid, and boron fluoride phosphoric acid, and keeping the amount of split off water at not exceeding 0.8 mol of $H_2O$ per mol of acetophenone.

2. A process as claimed in claim 1, in which the condensation catalyst is boron trifluoride.

3. A process for the preparation of 1,3,5-triphenyl-benzene by condensation of acetophenone with splitting off of water, comprising heating acetophenone in the presence of a catalytic amount of boron trifluoride formic acid.

4. A process for the preparation of 1,3,5-triphenyl-benzene by condensation of acetophenone with splitting off of water, comprising heating acetophenone in the presence of a catalytic amount of boron trifluoride diacetic acid.

5. A process for the preparation of 1,3,5-triphenyl-benzene by condensation of acetophenone with splitting off of water, comprising heating acetophenone in the presence of a catalytic amount of boron trifluoride phosphoric acid.

6. A process as claimed in claim 1, in which the condensation catalyst is used in an amount of 0.1–5.0%, based on the weight of acetophenone introduced into the process.

7. A process as claimed in claim 1, in which condensation of acetophenone is carried out in the range of 200°–250° C.

8. A process as claimed in claim 1, in which condensation and the removal of water is carried out continuously by continuous feeding of the mixture of acetophenone and catalyst to a distillation system which includes a fractionating space, through which said mixture is caused to pass and from which water is removed by distillation to a water separator; a sump space to which the material treated passes from the fractionation space and from which the treated material is discharged continuously; and means for heating the material treated in the distillation system.

9. A process as claimed in claim 1, in which a mixture of acetophenone and dypnone is used as starting material.

10. A process as claimed in claim 1, in which the resulting reaction product is cooled in order to solidify the 1,3,5-triphenyl-benzene and the cooled material is centrifuged in order to separate the solidified 1,3,5-triphenyl-benzene from the accompanying material.

11. A process as claimed in claim 10, in which the material separated from 1,3,5-triphenyl-benzene by centrifuging is subjected to distillation in order to separate 1,3,5-triphenyl-benzene present in said material from accompanying ingredients.

References Cited in the file of this patent

UNITED STATES PATENTS

| | | |
|---|---|---|
| 2,049,058 | Gleason | July 28, 1936 |
| 2,377,433 | Lieber | June 5, 1945 |
| 2,398,074 | Brandt | Apr. 9, 1946 |
| 2,419,142 | Ipatieff et al. | Apr. 15, 1947 |